(12) United States Patent
Smith et al.

(10) Patent No.: US 8,488,942 B2
(45) Date of Patent: Jul. 16, 2013

(54) BOOKMARK EXCHANGE

(75) Inventors: Michael Lawrence Smith, Canton, GA (US); Louise M. Wasilewski, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 330 days.

(21) Appl. No.: 12/824,791

(22) Filed: Jun. 28, 2010

(65) Prior Publication Data

US 2011/0317979 A1 Dec. 29, 2011

(51) Int. Cl.
*H04N 9/80* (2006.01)
*H04N 5/93* (2006.01)
*H04N 5/76* (2006.01)
*G11B 27/00* (2006.01)
*G06F 3/00* (2006.01)
*G06F 13/00* (2006.01)
*H04N 5/445* (2011.01)

(52) U.S. Cl.
USPC ........... 386/241; 386/278; 386/282; 386/291; 386/239; 386/248; 725/37; 725/39; 725/42

(58) Field of Classification Search
USPC .... 386/278, 282, 291, 239, 241, 248; 725/37, 725/39, 42
See application file for complete search history.

(56) References Cited

U.S. PATENT DOCUMENTS

| | | | | |
|---|---|---|---|---|
| 7,395,508 B2 * | 7/2008 | Hintermeister et al. | ...... | 715/751 |
| 8,037,504 B2 * | 10/2011 | Jerding et al. | .................. | 725/91 |
| 2003/0037123 A1 * | 2/2003 | Hoang | .......................... | 709/219 |
| 2007/0150930 A1 * | 6/2007 | Koivisto et al. | ............... | 725/134 |
| 2009/0119328 A1 * | 5/2009 | Raza et al. | .................... | 707/102 |

\* cited by examiner

*Primary Examiner* — Daquan Zhao
(74) *Attorney, Agent, or Firm* — Merchant & Gould

(57) ABSTRACT

A bookmark communicates precisely the location within an asset where a video clip referenced by the bookmark can be found as well as the start and stop times of the video clip. A subscriber watches a program on a video device or other platform. When the subscriber decides to create a bookmark, the subscriber pauses the program. A bookmark interface is initiated, wherein the subscriber creates a bookmark references a video clip of the program. The first subscriber then selects at least one other subscriber to send the bookmark to. A second subscriber receives the bookmark. The receipt of the bookmark activates a bookmark interface that is displayed on the video device of the second subscriber. The second subscriber initiates an action associated with the bookmark, which may include selecting to watch the video clip associated with the bookmark.

35 Claims, 6 Drawing Sheets

BOOKMARK EXCHANGE

FIELD OF THE INVENTION

This disclosure relates in general to media bookmarks, and more particularly to a portable bookmark that communicates precisely where in an asset a video clip referenced by the bookmark can be found.

BACKGROUND

A dramatic increase in content availability has occurred in recent years. Coupled with this phenomenon is the proliferation of a wide variety of consumption devices. Accordingly, the way media is consumed is rapidly changing. Further, with the advent of video-on-demand services and digital video recorders, consumers are less likely to watch shows at the same time or in the same place. This is in stark contrast to the period of television's infancy where the family would gather around the set together. This may be referred to as appointment television. What started as a social activity has evolved largely into an individual experience where the viewer often watches a show alone when the time is convenient for the viewer, e.g., characterized as personal television.

Television viewing provides a common experience, often affording even total strangers a social connection on which to initiate conversation. Today, however, users favor non-live media sources, such as Digital Video Recorders (DVRs), Video-On-Demand (VOD) and pay-per-view (PPV) services and even rented physical media (e.g. DVDs via Netflix to view at the users' convenience).

Furthermore, viewers today can become overcome by the number of channels and programs available in the typical home. Viewers can no longer efficiently browse a printed TV guide and decide what shows to watch. Finding something of interest to watch has become very difficult. As a result, viewers often randomly scan multiple channels ("channel surf") to find a show of interest.

Digital TV service providers have tried to respond to this information overload problem in a few ways. Electronic program guides (EPGs) improve a viewer's ability to filter through a multitude of choices. Interactive program guides (IPGs) provide basic search capabilities. However, the shear volume of channels and shows makes searches difficult unless a viewer knows exactly what show or search terms to include in a search request. Despite the availability of devices for searching electronically, viewers still prefer channel surfing as a method to select what to watch. DVR systems will automatically record shows for users based on previous viewing history. Nevertheless, advanced suggestion technologies often miss shows a user would like to have viewed.

Another consequence to the revolution in the viewing habits of consumers is the drastic decline in the effectiveness of advertising. Without the in flux of advertising dollars, the quality of content can suffer. The primary source of revenue for television stations is advertising revenue. Most cable networks sell advertising spots to national advertisers, and some also provide local advertisement availability to cable operators that then sell such local advertising spots to local advertisers. Advertisers are now looking at ways to create relationships with consumers. People may not care much for commercials, but they like goods and services and are in constant search of information about them. Thus, advertising needs to be developed into something that people are not only willing to put up with but that will also cause people to actually view advertisements in a positive light.

Accordingly, viewers need new mechanisms for content discovery and navigation, while providers and advertisers need new ways to analyze and monetize usage.

It can be seen then that there is a need for a way to bring people together through content discovery while opening new avenues for revenue generation.

SUMMARY OF THE INVENTION

To overcome the limitations described above, and to overcome other limitations that will become apparent upon reading and understanding the present specification, embodiments for bringing people together through content discovery while opening new avenues for revenue generation are disclosed.

The above-described problems are solved by sharing a bookmark that communicates precisely where in an asset a video clip referenced by the bookmark can be found.

An embodiment includes a method for creating a bookmark associated with a video clip for exchange with communication system users. The method includes presenting a program on a video device, such as VOD on the web, mobile devices, etc., of a first subscriber, pausing the program by the first subscriber, initiating by the first subscriber a bookmark interface, using the bookmark interface by the first subscriber to create a bookmark referring to a video clip of the program and selecting a second subscriber, by the first subscriber, for routing the bookmark to.

In another embodiment, a method for using a bookmark associated with a video clip is disclosed. The method includes receiving a bookmark associated with a video clip, in response to receiving the bookmark, activating a bookmark interface for display on a video device and initiating an action associated with the bookmark.

In another embodiment, a system for creating bookmarks is disclosed. The system includes a media device, disposed at a first subscriber, for presenting content thereon and a content processing device, coupled to the media device, the content processing device processing content received for presentation by the media device, wherein the content processing device further implements a bookmark interface that presents bookmarking functions on the media device for creating a first bookmark associated with a video clip from the content presented on the media device.

A computer readable medium including executable instructions which, when executed by a processor, creates a bookmark associated with a video clip for exchange with communication system users, is disclosed. The computer readable medium includes instructions executable by the processor to present a program on a video device of a first subscriber, pause the program by the first subscriber, initiate by the first subscriber a bookmark interface, use the bookmark interface by the first subscriber to create a bookmark referring to a video clip of the program and select a second subscriber, by the first subscriber, for routing the bookmark to.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to bringing people together through content discovery while opening new avenues for revenue generation are disclosed. A portable bookmark is provided that communicates precisely where in an asset a video clip referenced by the bookmark can be found.

Figure 1:
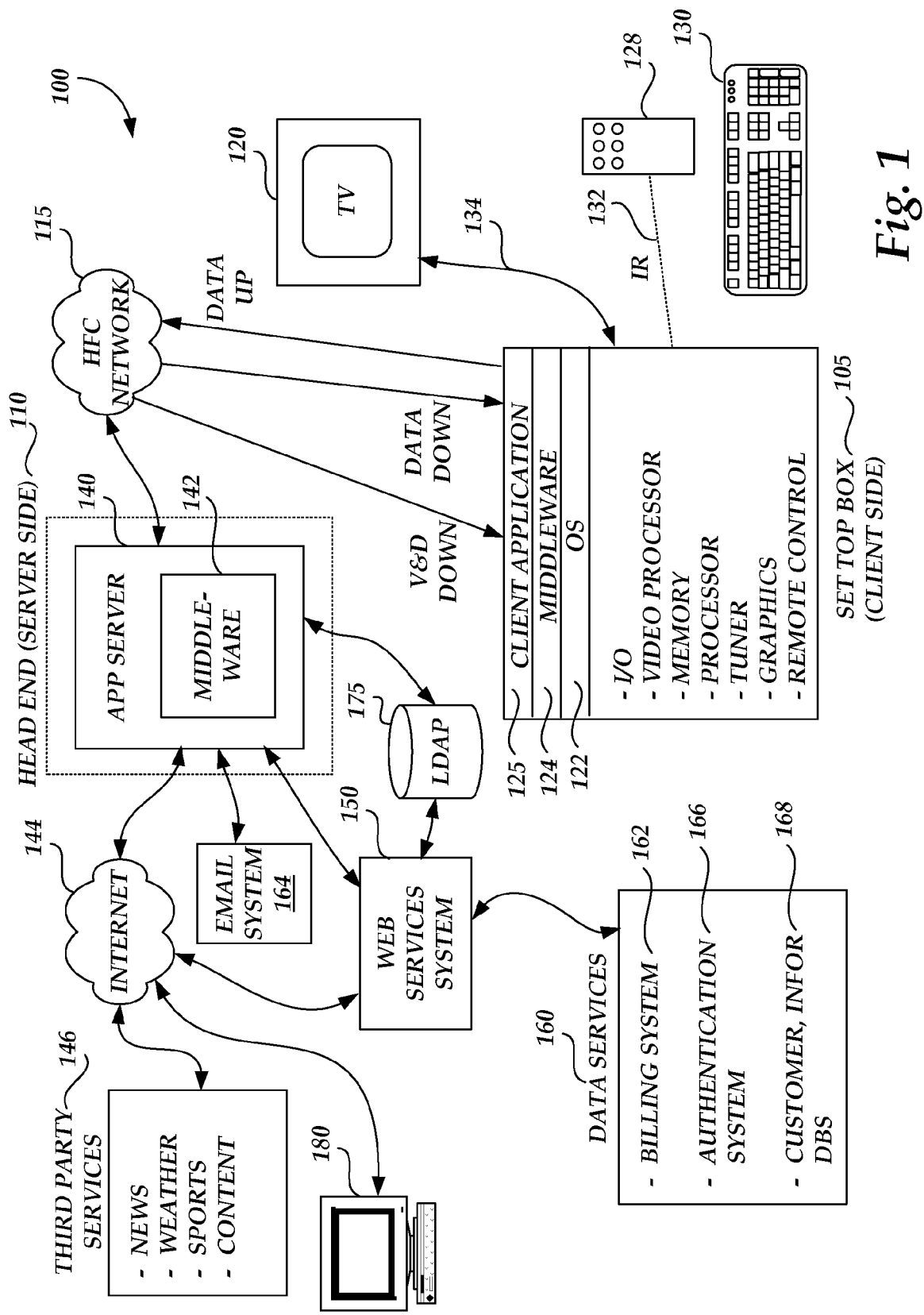
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention. However, those skilled in the art will recognize that other technology and configurations could be used to provide the same services.

According to embodiments of the present invention, the CATV system 100 is in the form of a distributed client-server computing system for providing video and data flow across the HFC network 11 5 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML), or a more data efficient derivative thereof.

The set-top box 105 passes digital and analog video and data signaling to the television 120 via a one-way communication transport 134. The STB 105 may receive signals from the server side of the CATV system 100 via the HFC network 115. The STB 105 may transmit signals from the client side of the CATV system 100 to the server side of the CATV system 100 via the HFC network 115. Both "in band" and "out of band" signaling may be provided when the equipment provides for such. For example, Cable set-top boxes 105 and other elements of the CATV system 100 may be configured to send and receive out of band data for information such as program guides, channel lineups, and updated code images. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art. However, those skilled in the art will recognize that the present embodiments are not meant to be limited by the CATV system described above. Other configurations, frequency bands, etc. may be implemented without departing from the scope of the embodiments described herein.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data, or a compressed format thereof, may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 11 5 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
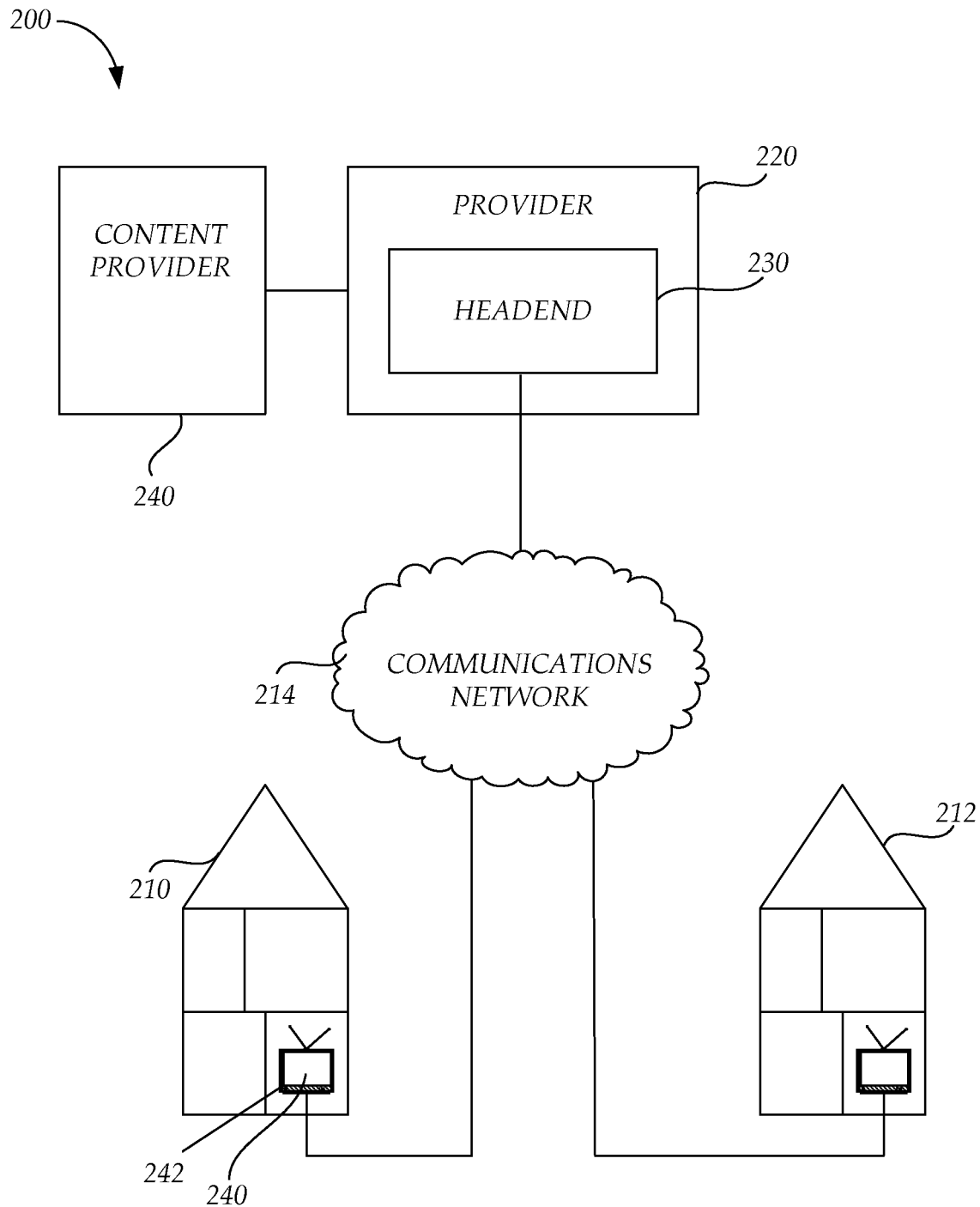
FIG. 2 shows a communications system according to an embodiment of the invention.

FIG. 2 shows a communications system 200 according to an embodiment of the invention. In FIG. 2, a first customer 210 and a second customer 212 are coupled to a communications network 214. The customers 210, 212 are subscribers of a provider 220 of the communications network 214. The provider 220 may be, for example, a cable operator, a satellite television operator, an ISP, etc. Herein, the embodiments will be described in the context of a cable operator. However, those skilled in the art will recognize that the embodiments are not meant to be limited to this context.

In FIG. 2, the provider 220 may provide content and communication services to customers 210, 212 via the communications network 214 from a headend 230. The first customer 210 may be watching a program 240 on television 242. The customer may bookmark a point in the program 242. The creation of the bookmark in program 242 allows customer 210 to send customer 212 a clip of the program 242 so that customer 212 can view the clip of program 242. After watching the clip of program 242, customer 212 may decide whether to watch the program 242 associated with the clip. The creation of the bookmark in program 242 by subscribers 210, 212 provides a service that requires the subscribers 210, 212 to interact with their television which creates subscriber loyalty and retention. Further, the creation of the bookmark in program 242 by subscribers 210, 212 promotes content for the communications system provider 220 and provides a form of promotion for the content provider 240. The system may be configured so that such clips may be opted in or out by the customers 210, 212 at will. In FIG. 2, the content provider 240 is separate from the communications system provider 220. However, those skilled in the art will recognize that content may be provided by the communications system provider 220, a separate content provider 240 or both.

Those skilled in the art will recognize that bookmarks need not be limited to transmission entirely over the communications network 210. For example, bookmarks may be sent to other customers of the communications provider 220 via email, push links, etc. In addition, social media may be used in conjunction with bookmarks according to an embodiment of the invention. For example, bookmarks may be provided on Twitter, MySpace™, Facebook®, Friendster$^{SM}$, etc. that allow others to view the video clip. Such users should otherwise have access to the content, e.g., they must also be a subscriber of the communications system provider 220. This sampling of content may be accomplished on the Internet, thus the recipient 212 need not reside with the same cable instance as the sender 210.

Figure 3:
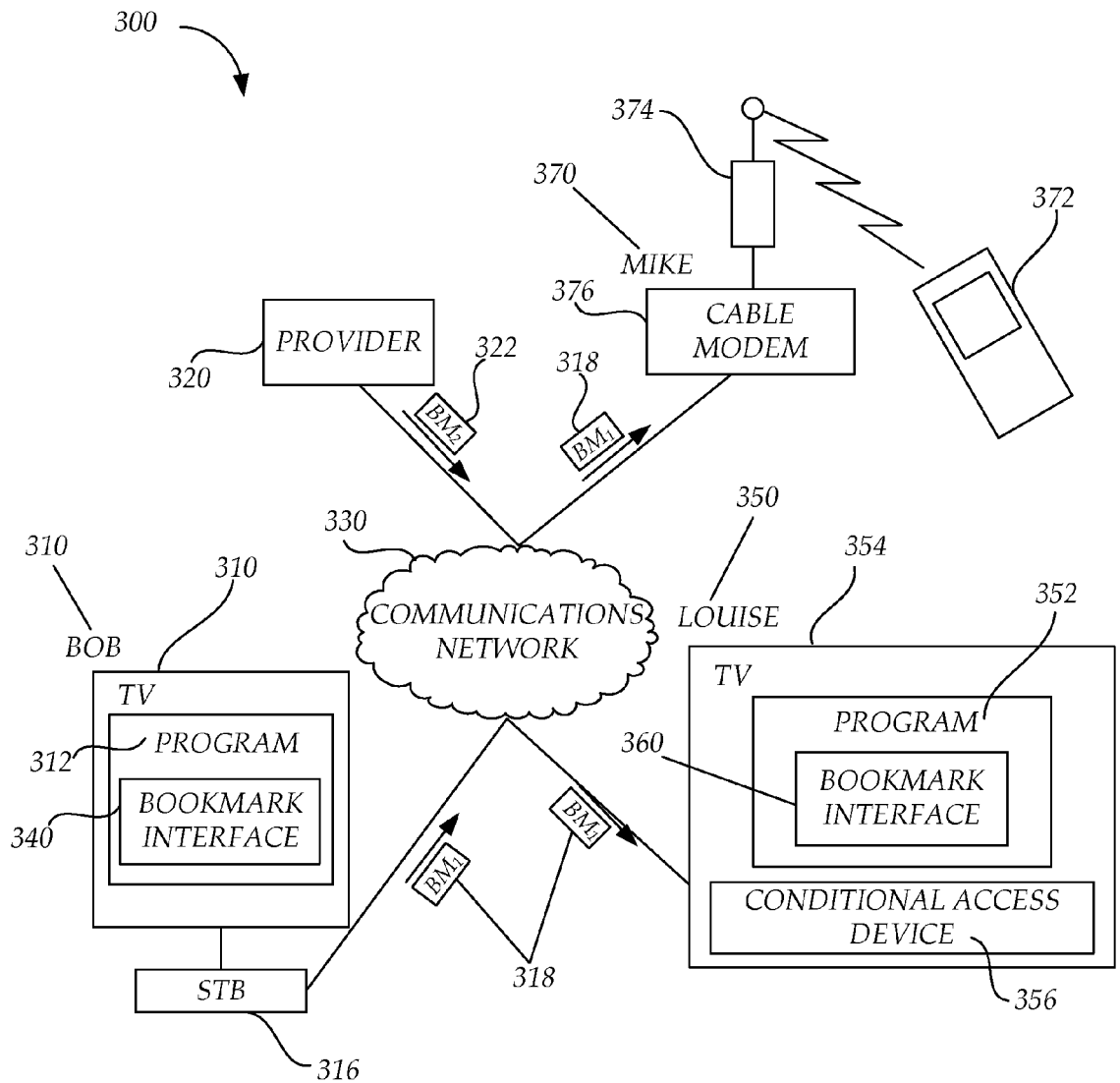
FIG. 3 is a system diagram showing the implementation of an embodiment of the invention.

FIG. 3 is a system diagram 300 showing the implementation of an embodiment of the invention. In FIG. 3, a first subscriber, Bob 310, is watching a program 312 on TV 314. TV 314 is coupled to set-top box 316, which receives the program 312 from provider 320 via communications network 330. Herein, embodiments of the invention will include references to different conditional access devices, such as set-top boxes, cableCARDs™, etc. Conditional access devices may be configured to enable receipt and selection of digital and analog cable channels, to uniquely identify a customer and authorize the features to which they have subscribed, to decode scrambled digital channels and premium programming such as movie channels, to provide interactive two-way communications such as interactive programming guides (IPGs), pay-per-view (PPV) content, video-on-demand (VOD), etc.

Bob 310 decides to create a bookmark and thus causes the bookmark interface 340 to be displayed on TV 314. Using the bookmark interface 316, Bob 310 selects a portion of the program 312 to bookmark and causes a first bookmark 318 of a location in the asset, and a direction to be transmitted through the communications network 330. Bob 310 has selected to forward the bookmark to Louise 350 and Mike 370.

The first bookmark 318 is more precise than chaptering as used in DVDs. Nevertheless, chaptering merely provides navigation for a DVD and is not externally available to other applications. Further, the concept of chaptering does not exist within video-on-demand (VOD) today. Bookmarking exists today in VOD solely for the sole purpose of restarting the VOD from a paused state at the point where the VOD was paused. However, VOD bookmarks, like DVD chaptering bookmarks, are not generally externally available to other applications, i.e., they are limited to local VOD applications and are not shared outside the cable system context.

Louise 350 is also watching a program 352 on TV 354. TV 354 receives the program 352 from provider 320 through communications network 330 using a conditional access card 356, e.g., a CableCARD™. Depending upon how Louise 350 has configured the bookmark interface 360, upon receiving first bookmark 318 from Bob 310, bookmark interface 360 may display a message indicating the receipt of the first bookmark 318. Louise 350 may save the first bookmark 318 for later reference, select the bookmark 318 to watch the video clip associated with the first bookmark 318, delete the first bookmark 318, purchase the movie containing the bookmark 318, etc.

As mentioned, the first bookmark 318 is also forwarded to Mike 370. Mike has a portable media device 372 that he receives content on from cable modem 376. A wireless adapter 374 may be used to route the first bookmark 318 from the cable modem 376 to the portable media device 372 of Mike 370. Mike 370 may also be provided with the same or similar options that Louise 350 was provided regarding the handling of the first bookmark 318, e.g., save the first bookmark 318 for later reference, select the bookmark 318 to watch the video clip associated with the first bookmark 318, delete the first bookmark 318.

FIG. 3 also shows a second bookmark 322 that is forwarded to at least one subscriber, e.g., Bob 310, Louise 350, Mike 370, etc. Bookmarks 316, 322 according to an embodiment of the invention are externally available. Externally available bookmarks create an opportunity for the development of many other discrete applications. Those skilled in the art will recognize that bookmark 322 may be created by content providers, the communications system provider, etc. to promote PPV events, special packages, VOD offerings, targeted advertisements, notice of upcoming programs, etc. These non-subscriber bookmarks 322 may also be used to view special video clips such as news updates, entertainment news, sports highlights, etc. A sequence of bookmarks may be used to create a "highlights" version of an asset as a teaser, instead of editing a formal preview.

Examples of applications that may use bookmarks 318, 322 according to an embodiment of the invention include creating video greetings through concatenating bookmarks associated with clips from multiple sources, which is similar to CD mixing. Bookmarks 318, 322 for movie recommendations, which include a buy option for a VOD asset on a STB, broadband, cell, DVD, show tickets or other merchandise, may also be created. Bookmarks 318, 322 associated with commercial or other advertisement may be forwarded to increase impressions rather as Super Bowl advertisements are viewed outside the initial context. Bookmarks 318, 322 may also be shared across media, e.g., from video subscription to cellphone. Bookmarks 318, 322 associated with an abridged version of a movie could be created and shared for consumption on a phone or other video device. Bookmarks 318, 322 do not necessarily have to be associated with video, but may only refer to audio, which may be used as a ringtone. User may create bookmarks 318, 322 for previews or reviews, which may be forwarded to other users. Bookmarks 318, 322 may include a qualifier that is associated with a clip to apply trick modes, such as rewind, slow motion, etc. Trivia applications may be created based on bookmarks 318, 322, wherein customers are asked to identify the movie, actor, product, etc. Bookmarks 318, 322 may also be created to refer to video clips for selling sell products, such as the dress an actress is wearing. Those skilled in the art will recognize that this list is not meant to be exhaustive, but rather provides only a few examples of how bookmarks according to an embodiment of the invention may be used as well as examples of applications that take advantage of bookmarks 318, 322 according to an embodiment of the invention.

The bookmark interface 340 is implemented by the set-top box 316 or other conditional access device 356. The video clip of the program 312 identified by the bookmark 318 maintains the subscriber security provided by pin challenges so that restrictions on mature/adult content is not by-passed by selection of a bookmark. A bookmark 318 may integrate multiple blocks of content, e.g., adult and sport. The information provided by the bookmark 318 that is sent from one subscriber to another would only need the reference to the globally unique ID for a video asset. The bookmark 318 also would identify the place in time, which would reference NPT values in an asset to start the clip. The bookmark 318 would also be of a defined length, with a maximum limit set by the cable system provider 220 or content provider 240, with reference to FIG. 2. The bookmark interface 340 may be configured to support creation of the bookmark at the point where the video is paused. Digital Rights Management (DRM), such as included with music videos, is handled by the conditional access device 356 or set-top box 316 or equivalent function on the Internet. The differences in media types can be addressed in the metadata (asset or folder), but would have to be synchronized across media. The media being bookmarked could be linked with MPEG2, H.264, VC-1 (SMPTE 421M), Flash™ or any other codec. The exchange concept takes advantage of the benefits of viral networks to promote content. This information sharing could also be used to share advertising. A shared bookmark would allow a user to see a video clip and then be presented with subscription or purchase options. The previews provided through the use of bookmarks 318 according to an embodiment of the invention may be implemented to allow only a fixed preview. Nevertheless, a bookmark 318 may include fixed previews that are concatenated by a subscriber in multiple discrete clips in a non-chronological order. A bookmark 318 according to an embodiment of the invention may include an asset description, e.g., an XML file, that may be shared. The bookmark with the asset description may then be sent via email or any other mechanism, and may be cross-referenced on a central global asset ID repository (not shown).

Figure 4:
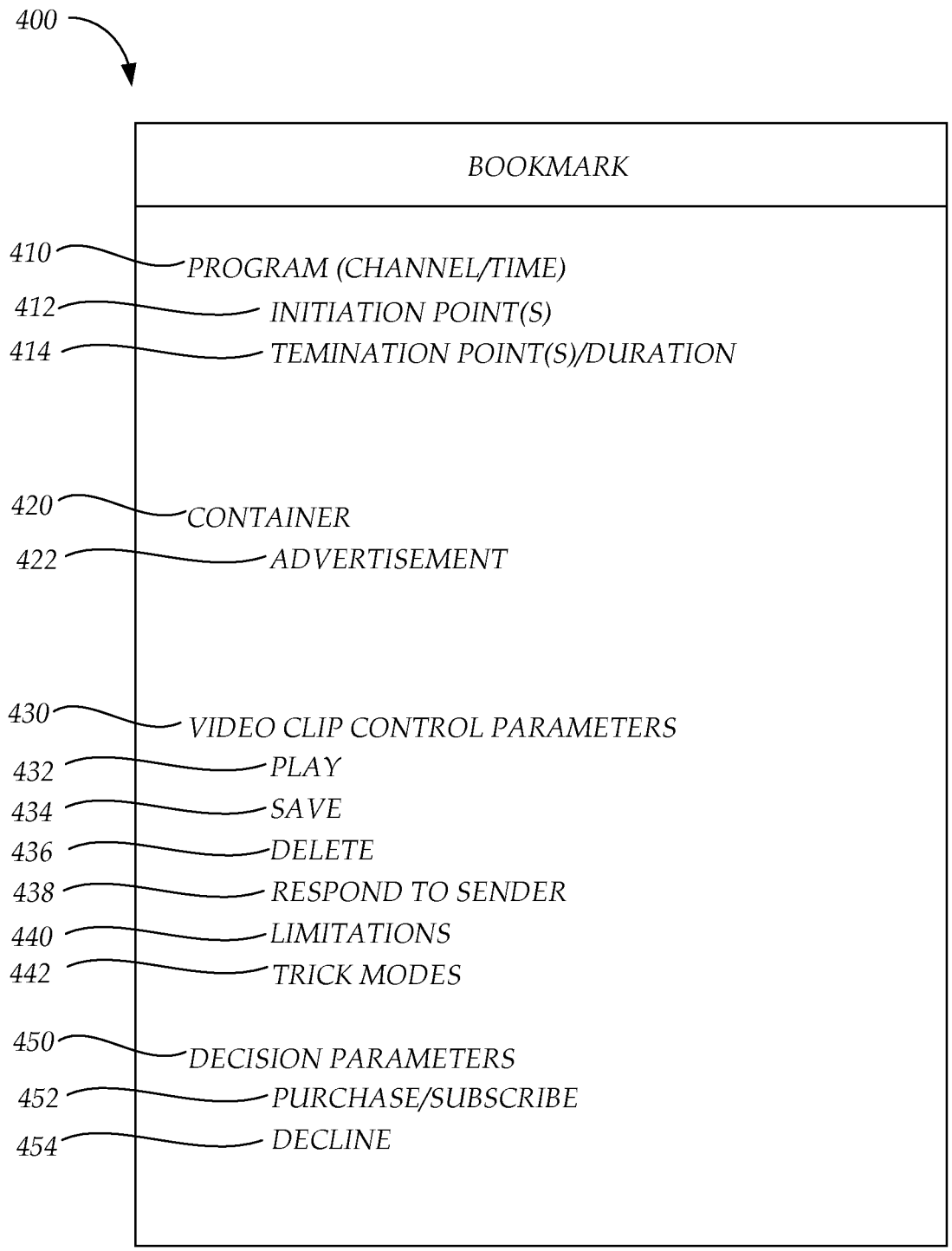
FIG. 4 illustrates a structure for a bookmark according to one embodiment of the invention.

FIG. 4 illustrates a structure for a bookmark 400 according to one embodiment of the invention. Those skilled in the art will recognize that bookmarks for video clips according to the invention are not limited to the structure described herein. A bookmark 400 may include a different configuration of data, parameters, descriptors, etc. that that described herein, wherein additions and deletions to the elements describe below may be made without departing from the scope of the invention. In FIG. 4, the bookmark 400 is associated with a video clip of a program 410. The bookmark 400 allows another party receiving the bookmark 400 to select the bookmark and watch a short clip of video, e.g., 5 seconds to 2 minutes, that is associated with the bookmark. The bookmark identifies a point in time of a video or program being watched. The bookmark information is forwarded to another subscriber who would then be able to view a small clip defined by the bookmark. The bookmark may only include reference information that is being forwarded, not an actual compressed file.

The program 410 is identified and an initiation point 412 and termination point 414 may be provided to define the video clip associated with the bookmark 400. Instead of a termination point 414, the metadata may include the duration for the video clip associated with the bookmark 400. The bookmark 400 may also include a container 420. While a bookmark 400 normally only includes metadata regarding the video clip associated with the bookmark 400, in some instances a container may be provided to provide a short video clip such as an advertisement 422. Similarly, the existing metadata may be embellished by commentary from the sender.

The bookmark 400 also may include video clip control parameters 430. Such parameters define controls related to the video clip that is associated with the bookmark 400. Some video clip control parameters 430 may include play 432, save 434, delete 436, respond to sender 438, limitations 440, trick modes 442, etc. Limitations define restraints on the creation of bookmarks and/or contiguous bookmarks written on a single asset to avoid long excerpts or highlight piracy, such as with sporting events. The video clip control parameters 430 do not necessarily provide the functionality to carry out the operations, but only define what controls apply to the video clip that is associated with the bookmark 400.

The bookmark 400 also may include decision parameters 450. Decision parameters define responses that the subscriber may make regarding the video clip that is associated with the bookmark 400. For example, if the bookmark refers to video-on-demand (VOD) content, the decision parameters 450 enable the subscriber to purchase 452 the VOD content. Alternatively, the decision parameters 450 allow the subscriber to decline 454 the purchase of the VOD content. In some instances, the subscriber may be presented a bookmark 400 that offers a preview of premium channels and a chance to upgrade at a discount. In this instance, the he decision parameters 450 allow the subscriber to subscribe 452 to the premium channels.

Figure 5:
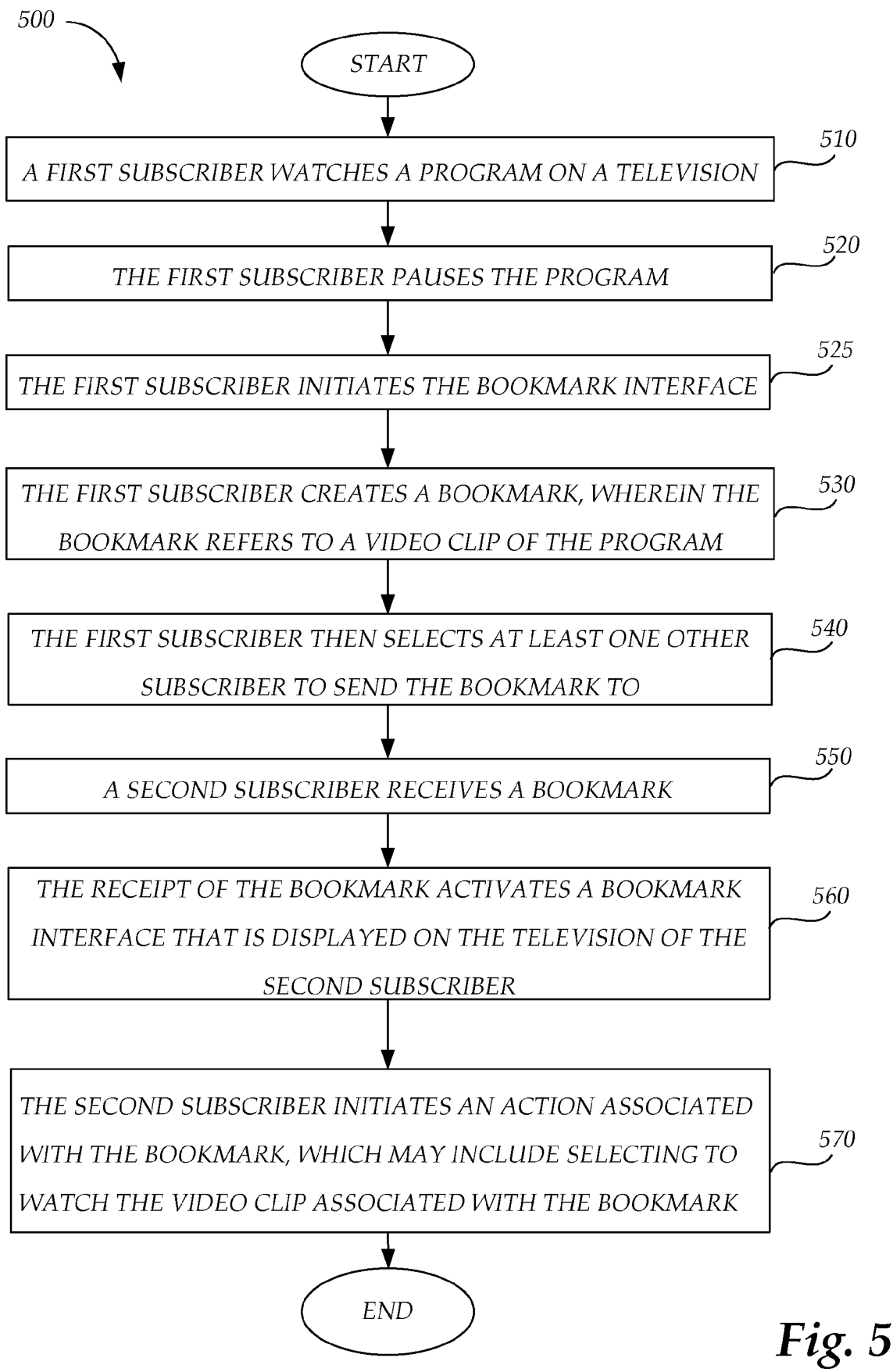
FIG. 5 is a flow chart of a method for providing bookmark exchange according to an embodiment of the invention.

FIG. 5 is a flow chart 500 of a method for providing bookmark exchange according to an embodiment of the invention. In FIG. 5, a first subscriber watches a program on a television 510. The first subscriber pauses the program 520. The first subscriber initiates the bookmark interface 525. Pausing the program may initiate the bookmark interface automatically. The first subscriber creates a bookmark, wherein the bookmark refers to a video clip of the program 530. The first subscriber then selects at least one other subscriber to send the bookmark to or sends the bookmark to a social networking tool such as Twitter 540

A second subscriber receives a bookmark 550. The receipt of the bookmark activates a bookmark interface that is displayed on a media device of the second subscriber 560, e.g., a television, PC, cellphone, etc. For example, the bookmark interface may allow the second subscriber to click a link in an email that initiates the display of the bookmark. The second subscriber initiates an action associated with the bookmark, which may include selecting to watch the video clip associated with the bookmark 570. The initiating an action may also include unlocking parental controls, authenticating authorizations, and navigating purchase options of a licensing window.

Figure 6:
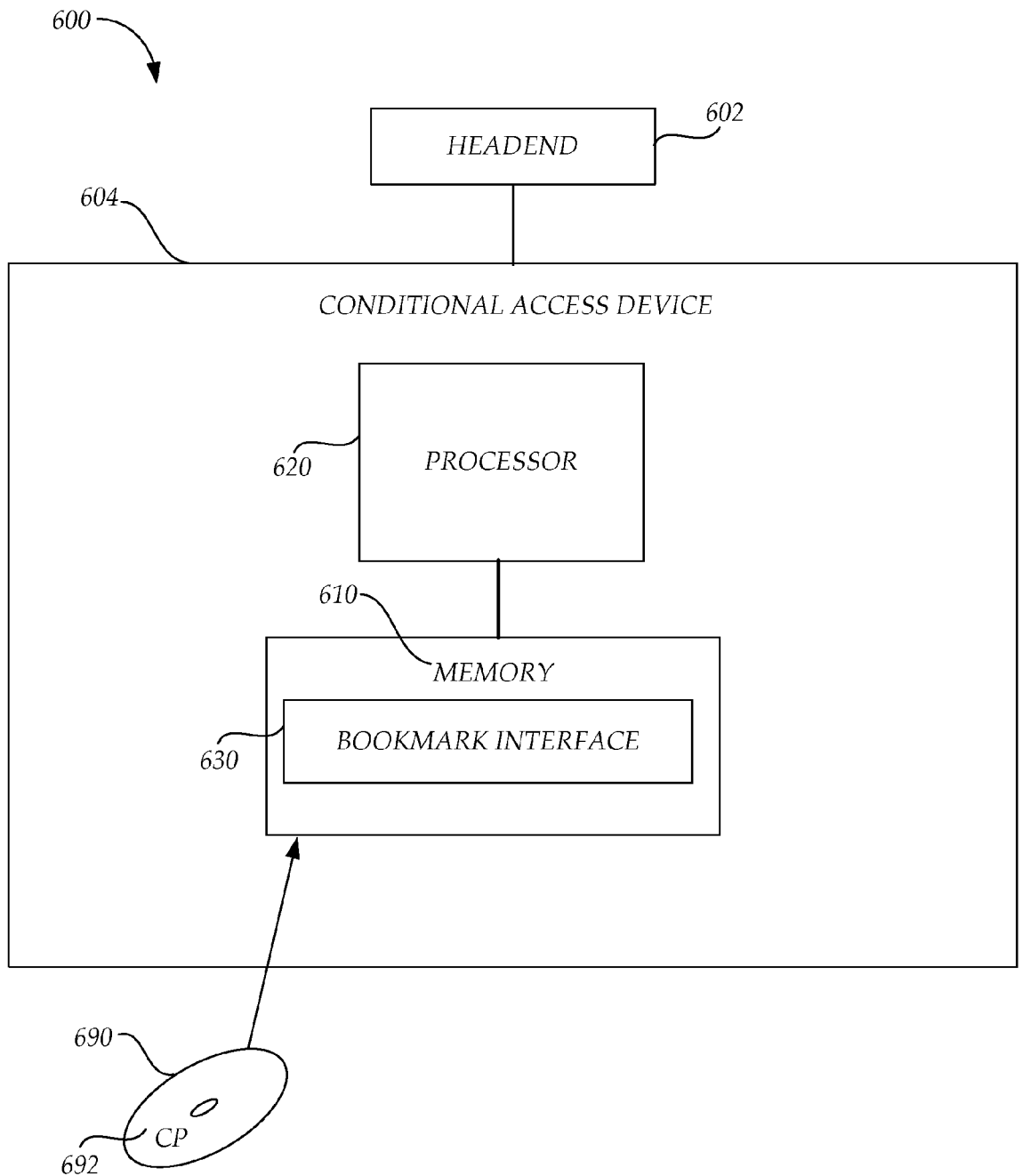
FIG. 6 illustrates a system according to an embodiment of the invention.

FIG. 6 illustrates a system 600 according to an embodiment of the invention. The system 600 includes a headend 602 that provides content to a conditional access device 604. The conditional access device 604 may be a STB, a DVR, a CableCard™, etc. The conditional access device 604 includes memory 610 for storing data. In FIG. 6, the conditional access device 604 is coupled to a headend 602 for receiving content therefrom. The memory 610 is in communication with processor 620. The memory 610 includes instructions for implementing a bookmark interface 630.

Embodiments may also be implemented in combination with computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including hand-held devices, set-top boxes, DVRs, multiprocessor systems, microprocessor-based or programmable consumer electronics, game consoles, minicomputers, mainframe computers, and the like. Embodiments may also be practiced in distributed computing environments where tasks are performed by remote processing devices that are linked through a communications network, e.g., through a web service and browser.

Embodiments implemented on computer-readable media 690 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 610 thus may store the computer-executable instructions that, when executed by processor 620, cause the processor 620 to implement a system as illustrated elsewhere in this detailed description of embodiments. However, memory 610 may also be configured to implement the bookmark interface 630 generated by processor 620.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for creating a bookmark associated with a video clip for exchange with communication system users, comprising:
   presenting a program on a video device of a first subscriber;
   initiating by the first subscriber a bookmark interface;
   using the bookmark interface by the first subscriber to create the bookmark referring to the video clip of the program; and
   selecting a second subscriber, by the first subscriber, for routing the bookmark, the bookmark including control parameters and decision parameters, the control parameters defining controls available for the second subscriber to respond to the bookmark and to control the video clip of the program, the decision parameters defining responses available to the second subscriber for viewing the program from which the video clip is obtained.

2. The method of claim 1, wherein pausing of the program automatically causes the initiating of the bookmark interface.

3. The method of claim 1 further comprising:
   receiving, at the second subscriber, the bookmark associated with the video clip;
   in response to receiving the bookmark, activating the bookmark interface, by the second subscriber, for display on the video device; and
   using the bookmark interface, by the second subscriber, to initiate an action associated with the control parameter of the bookmark.

4. The method of claim 3, wherein the initiated action comprises selecting to watch the video clip associated with the bookmark.

5. A method for using a bookmark associated with a video clip, comprising:
   receiving the bookmark from a first subscriber, the bookmark being associated with the video clip and including control parameters and decision parameters, the control parameters defining controls available for a second subscriber to respond to the bookmark and to control the video clip of the program, the decision parameters defining responses available to the second subscriber for viewing the program from which the video clip is obtained;
   in response to receiving the bookmark, activating a bookmark interface for display on a video device;
   initiating an action associated with the control parameter of the bookmark; and
   initiating a response associated with the decision parameter of the bookmark.

6. The method of claim 5, wherein the initiated action comprises selecting to watch the video clip associated with the bookmark.

7. A system for creating bookmarks, comprising:
   a media device, disposed at a first subscriber, for presenting content thereon; and
   a content processing device, coupled to the media device, the content processing device processing content received for presentation by the media device;
   wherein the content processing device further implements a bookmark interface that presents bookmarking functions on the media device for creating a first bookmark associated with a video clip from the content presented on the media device, the bookmark including control parameters and decision parameters, the control parameters defining controls available for a second subscriber to respond to the bookmark and to control the video clip of the program, the decision parameters defining responses available to the second subscriber for viewing the program from which the video clip is obtained.

8. The system of claim 7 further comprises a communications system provider.

9. The system of claim 8, wherein the communications system provider provides the content to the subscriber.

10. The system of claim 7, wherein the content processing device causes the bookmark interface to be displayed on the media device when content is paused.

11. The system of claim 7, wherein the content processing device provides the first subscriber selected routing to transmit the first bookmark through the communications network to the second subscriber.

12. The system of claim 7, wherein the first bookmark is externally available to additional applications.

13. The system of claim 7, wherein the content processing device, upon receipt of the first bookmark, initiates the bookmark interface and displays a message indicating receipt of the first bookmark.

14. system of claim 7, wherein a message presents options associated with the control parameters to the second subscriber for saving the first bookmark for later reference, for selecting the first bookmark to watch the video clip associated with the first bookmark, and for deleting the first bookmark.

15. The system of claim 7, wherein the media device is a television.

16. The system of claim 7, wherein the media device is a portable media device.

17. The system of claim 7, wherein the content processing device includes conditional access processing.

18. The system of claim 7, wherein the content processing device is a set-top box.

19. The system of claim 7, wherein the content processing device is a card having a processor for implementing conditional access processing.

20. The system of claim 7, wherein the first bookmark comprises a concatenation of references to a plurality of video clips.

21. The system of claim 7, wherein the first bookmark is configured to be shared across media.

22. The system of claim 7, wherein the first bookmark is configured to enable trick modes with video clips associated with the first bookmark.

23. The system of claim 7, wherein the first bookmark maintains the subscriber security provided by pin challenges to prevent restrictions on mature/adult content from being by-passed by selection of the first bookmark.

24. The system of claim 7, wherein the first bookmark comprises a plurality of integrated content.

25. The system of claim 7, wherein the first bookmark identifies the video clip by referencing a globally unique identifier for a video asset and start/stop times within the video asset.

26. The system of claim 7, wherein the first bookmark includes fixed previews concatenated in multiple discrete video clips in a non-chronological order.

27. The system of claim 7, wherein the bookmark interface is configured to receive a second bookmark from a provider of the communications network.

28. The system of claim 27, wherein the second bookmark from the provider of the communications network are configured to promote at least one selected from the group consisting of PPV events, special packages and VOD offerings.

29. The system of claim 27, wherein the second bookmark from the provider of the communications network are configured to display targeted advertisements to the subscriber receiving the second bookmark.

30. The system of claim 27, wherein the second bookmark from the provider of the communications network are configured to display information associated with upcoming programs.

31. The system of claim 27, wherein the second bookmark from the provider of the communications network are configured to display special video clips from the provider of the communications network.

32. A computer readable medium storing executable instructions which, when executed by a processor, creates a bookmark associated with a video clip for exchange with communication system users, by:
    presenting a program on a video device of a first subscriber;
    initiating by the first subscriber a bookmark interface;
    using the bookmark interface by the first subscriber to create the bookmark referring to the video clip of the program; and
    selecting a second subscriber, by the first subscriber, for routing the bookmark, the bookmark including control parameters and decision parameters, the control parameters defining controls available for the second subscriber to respond to the bookmark and to control the video clip of the program, the decision parameters defining responses available to the second subscriber for viewing the program from which the video clip is obtained.

33. The computer readable medium of claim 32, wherein pausing of the program by the first subscriber automatically causes the initiating of the bookmark interface.

34. The computer readable medium of claim 32 further comprising:
    receiving, at a second subscriber, the bookmark associated with the video clip;
    in response to receiving the bookmark, activating the bookmark interface, by the second subscriber, for display on the video device; and
    using the bookmark interface, by the second subscriber, to initiate an action associated with the control parameter of the bookmark.

35. The computer readable medium of claim 34, wherein the initiated action comprises selecting to watch the video clip associated with the bookmark.

* * * * *